United States Patent [19]
Skinner et al.

[11] 3,973,783
[45] Aug. 10, 1976

[54] PIPE JOINT SEALING DEVICE

[75] Inventors: Harry W. Skinner; Max D. Orn, both of Fort Wayne, Ind.

[73] Assignee: Harry W. Skinner, Fort Wayne, Ind.

[22] Filed: Mar. 4, 1975

[21] Appl. No.: 555,111

Related U.S. Application Data

[62] Division of Ser. No. 197,656, Nov. 11, 1971, Pat. No. 3,874,063.

[52] U.S. Cl. .............................. 277/190; 277/DIG.2; 285/189; 285/231
[51] Int. Cl.$^2$ .................... F16J 15/32; F16L 19/00
[58] Field of Search ........ 277/207 A, DIG.2, DIG.3, 277/190, 164; 285/189, 231

[56] References Cited
UNITED STATES PATENTS

| | | | |
|---|---|---|---|
| 2,924,472 | 2/1960 | Bush | 277/190 X |
| 3,680,874 | 8/1972 | Schwarz | 285/231 |
| 3,787,061 | 1/1974 | Yoakum | 277/207 A |

Primary Examiner—Samuel B. Rothberg

[57] ABSTRACT

This invention relates to a pipe joint sealing device. The device includes an annular resilient body of rubber which is generally V-shaped in cross-section which defines inner and outer annular flanges or body portions. This annular body or rubber ring is fitted into the opening of a rigid concrete structure, such as a manhole, in fluid-type engagement therewith. This engagement is interlocking which prevents the accidental dislodgement of the rubber ring from the opening, and is achieved b casting the concrete into lockingengagement with the outer peripheral surface of the ring, this ring being provided with an annular anchor portion which in cross-section is of keystone shape.

2 Claims, 11 Drawing Figures

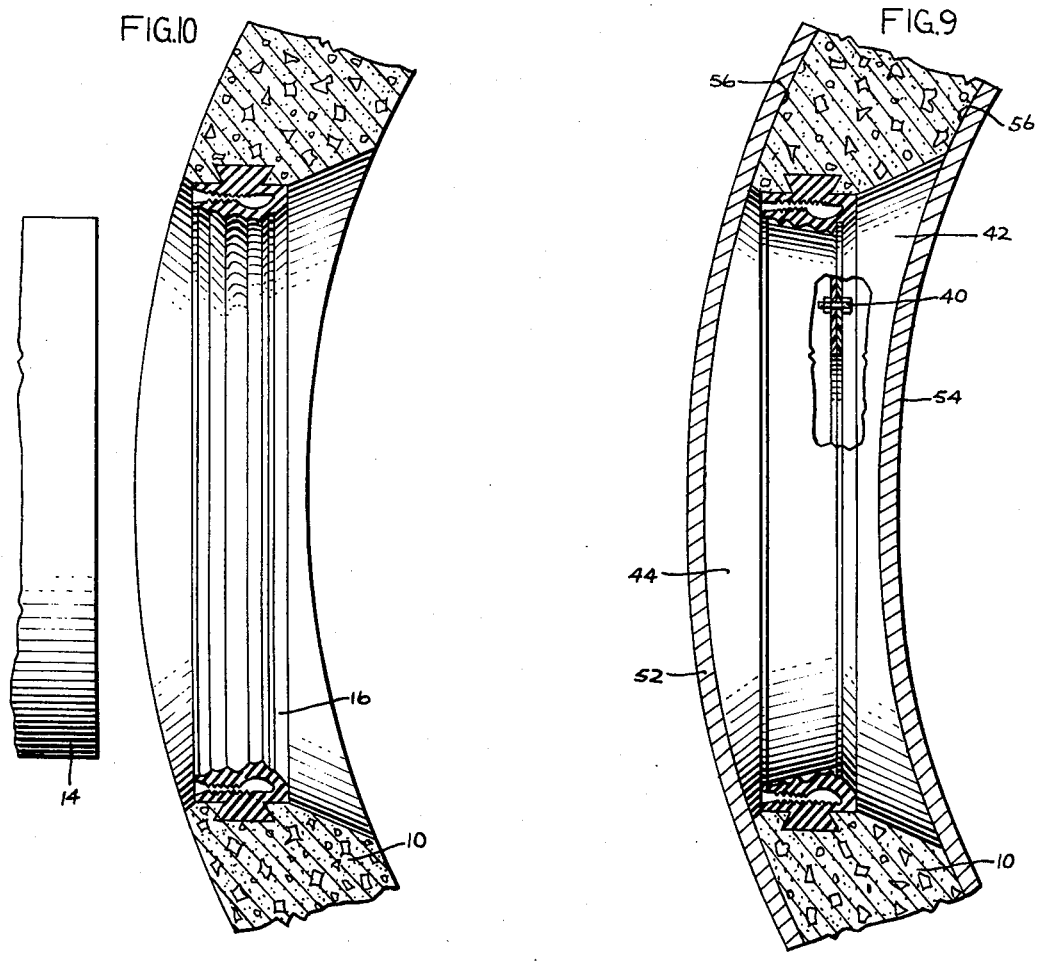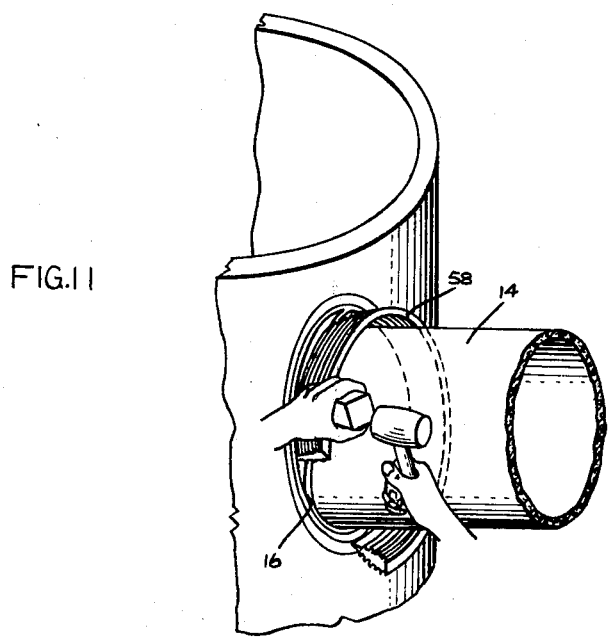

PIPE JOINT SEALING DEVICE

BACKGROUND OF THE INVENTION

1. Field of the Invention

This is a divisional of Application Ser. No. 197,656 filed Nov. 11, 1971, now U.S. Pat. No. 3,874,063. This invention relates to pipe joint sealing devices and more particularly to the sealing of concrete pipe joints.

2. Description of the Prior Art

Typical pipe joint structures are disclosed in U.S. Pat. Nos. 2,924,472; 2,935,349; and 3,348,850. In general, these structures include a sealing ring formed of rubber or rubber-like material which is inserted into the annular cavity formed in the usual pipe joint, whether this joint be formed between pipe sections or between the entry end of a section of pipe and the hole in a concrete manhole. Such prior art structures have not proven to be entirely satisfactory from the standpoints of ease of installation, durability, and economy. In one such structure, a sealing ring inserted into the joint cavity is provided with two flanges which may be forced apart by means of an auxiliary sealing wedge. The friction of engagement between the sealing ring and the opposing walls of the annular cavity provide the holding power against dislodgement, but it has been found that pressure fluid internally of the pipes can blow out the seal or produce leakage. In another prior art structure, annular metal clamps are used to secure the sealing ring into the cavity; however, this has proven to be costly and time consuming in the manufacture and installation thereof.

SUMMARY OF THE INVENTION

In accordance with the broader aspects of this invention, there is provided a pipe joint sealing device which includes an annular resilient body of rubber-like material. This body is generally of V-shaped cross-section which defines radially inner and outer annular body portions or flanges A rigid concrete structure, such as a manhole, a pipe section, a septic tank, or the like, is provided with the usual opening into which a section of pipe is to be fitted. Into this opening is secured the aforesaid annular body or sealing ring, the outer flange thereof having an interlocking engagement with the perimetral portion of the opening. In one form of the invention, this interlocking engagement is provided by casting or molding concrete around the outer periphery or flange of the sealing ring such that when the concrete hardens, the ring is locked into position. For insuring an interlocking engagement, an annular anchor may be provided on the outer periphery of the ring, which in crosssection is of keystone shape, such that upon hardening of the concrete, the ring is locked into place. In general, the finished product is thus an assembly which includes a rigid concrete structure provided with an opening in effect lined with a rubber sealing ring. A section of pipe to be joined to the manhole is simply entered into the sealing ring, requiring only negligible further installation procedure. This seal between the concrete manhole and the pipe is completed by inserting a wedge of rubber material into the space between the inner and outer flanges of the ring for spreading the same into intimate engagement with the pipe periphery.

It is therefore an object of this invention to provide a pipe joint sealing device which is simple in construction, economical to manufacture, and substantially trouble-free in operation.

It is yet another object of this invention to provide a pipe joint sealing device which requires only a minimum of time for effecting the installation of a section of pipe into the opening of a concrete structure to which the pipe is to be joined.

It is yet another object of this invention to provide a pipe joint sealing device which permits some relative movement between a section of pipe and another structure to which it is joined without causing failure of the seal or damage to the pipe.

The above-mentioned and other features and objects of this invention and the manner of attaining them will become more apparent and the invention itself will be best understood by reference to the following description of an embodiment of the invention taken in conjunction with the accompanying drawings, wherein:

BRIEF DESCRIPTION OF THE DRAWINGS

In the drawings,

FIG. 9 is a fragmentary sectional view illustrating certain of the steps involved in fabricating the joint of this invention;

FIG. 10 is a view similar to FIG. 9 showing the rubber-sealing ring locked in place in the opening of a concrete manhole; and FIG. 11 is a perspective illustration showing the final step of completing the seal between a section of pipe entered into the fabricated, lined opening in the manhole.

DESCRIPTION OF THE PREFERRED EMBODIMENT

Figure 1:
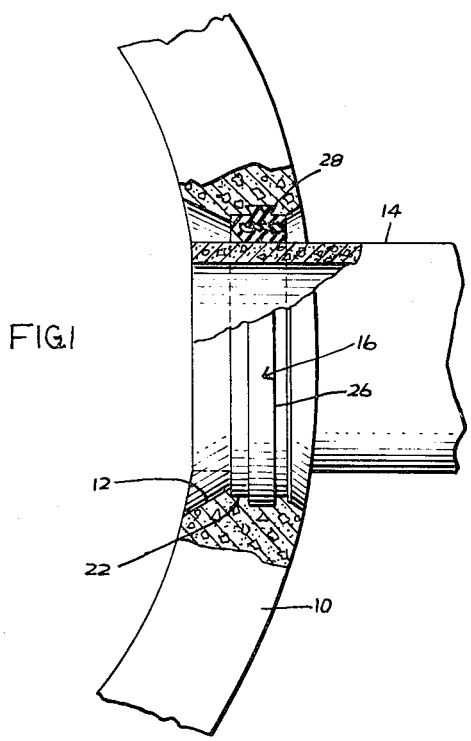
FIG. 1 is a fragmentary view, partially sectioned for clarity of illustration, of one embodiment of this invention wherein a section of entry pipe is joined to a manhole.
Figure 2:
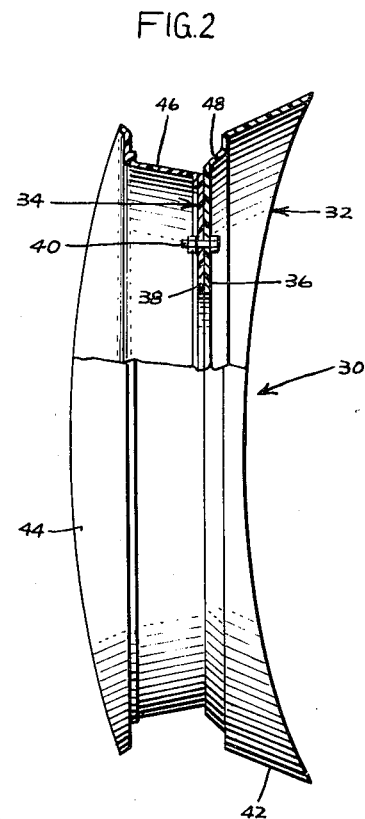
FIG. 2 is a side view, partly sectioned for clarity of illustration, of a ring-mounting plug used in fabricating the sealing joint of this invention.

Referring to the drawings, and more particularly to FIG. 1, a conventional manhole 10 of cylindrical shape and formed of concrete is provided with a circular opening 12 of the cross-sectional shape shown into which a section 14 of pipe is installed. A sealing ring of rubber or rubber-like material 16 is fitted into the annular space between the perimeter of the opening 12 and the pipe section 14, this ring 16 providing a fluid-tight seal that typically prevents leakage of water from the manhole 10 past the exterior pipe section 14.

The ring 16, preferably made of rubber, may be formed of other materials such as vinyl plastic or the like which exhibit pliable, resilient characteristics much like rubber. In a working embodiment of this invention, the ring 16 is provided with a shape shown more clearly in FIG. 5. The ring is essentially V-shaped in cross-section thereby defining radially inner and outer annular portions or flanges 20 and 22 (the drawings being substantially to scale) which are serrated on the inner surfaces and is provided with an annular cavity 24 in the portion 20. On the flange 22 is provided a radially outwardly projecting anchoring annulus 26 of keystone cross-section, the outer surface of flange 22 being substantially cylindrical and extending equal distances from the opposite sides of the anchor 26.

Figure 5:
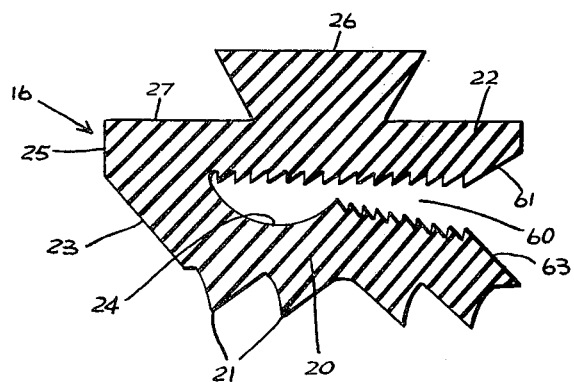
FIG. 5 is a cross-sectional illustration of one embodiment of the rubber-sealing ring of this invention.

The inner surface of the flange 20 is provided with four radially inwardly projecting ribs 21 which, in cross-section, are generally of triangular shape as is shown more clearly in FIG. 5. The four ribs are contained in two pairs or groups, the ribs of each pair being inclined oppositely from those of the other pair as shown. One end of the flange 20 is provided with an annular surface 23 at an angle of about 45° to the axis of the ring 16. This surface 23 merges into yet another surface 25 at right angles to the axis.

Figure 6:
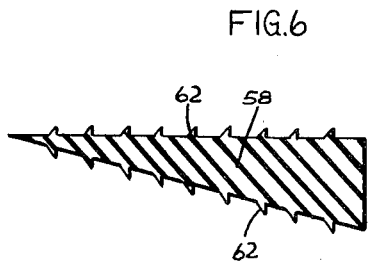
FIG. 6 is a cross-section of a rubber wedge used in conjunction with the sealing ring of FIG. 5.
Figure 3:
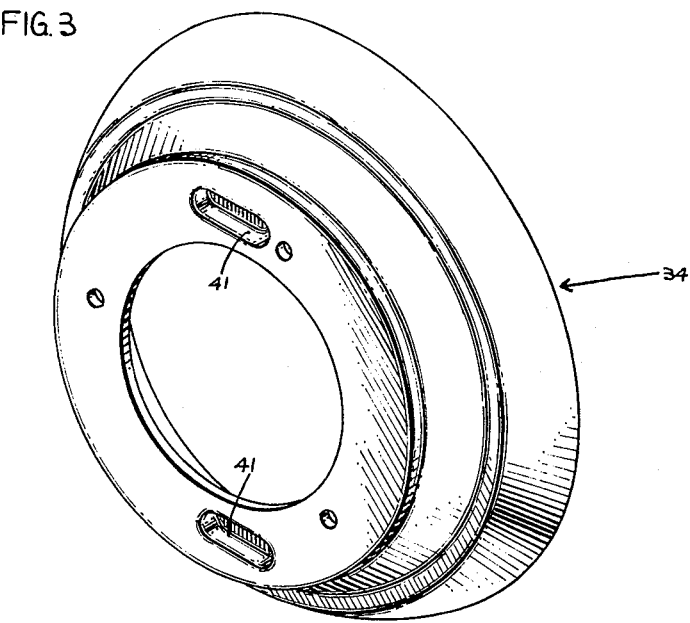
FIGS. 3 and 4 are plan views of the two different sections making up the plug of FIG. 2.
Figure 4:
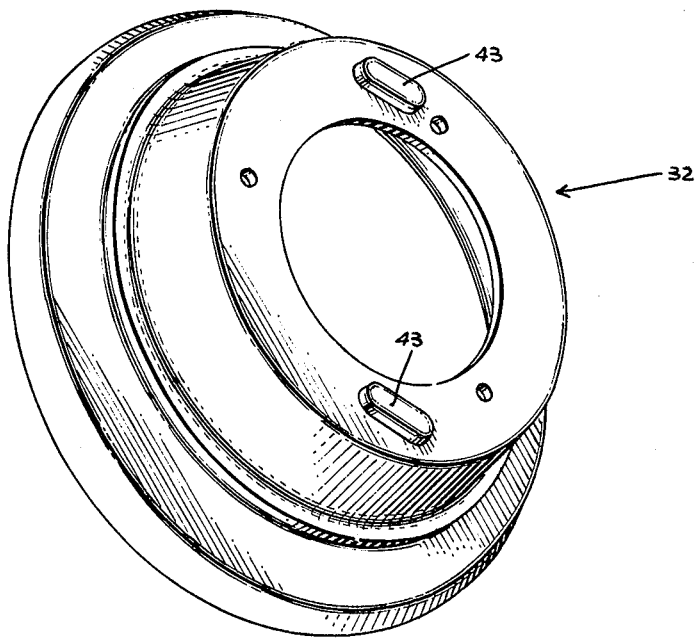

The space 60 between the two flanges 20 and 22 is further defined by the two beveled edges 61 and 63 which serves in providing a wider entrance way into the space 60 for the strip of wedge 58 of FIG. 6.

Referring to FIG. 1, it will be noted that the anchor 26 intimately fits into an annular socket 28 of complementary size and shape which serves to lock the anchor to the perimeter of the opening 12. The concrete forming the opening 12 also intimately engages the cylindrical surface of the flange 22 such that the ring 16 is positively interlocked with the concrete and thereby prevented from dislodgement either radially or axially from the opening 12.

The actual installation of a section of pipe 14 into the fabricated opening just defined will be explained later on. In the following will be described the apparatus and method for fabricating the rubber-lined opening in the manhole.

The manhole 10 is cast or molded of concrete according to conventional methods. However, a unique structure is utilized for the purpose of not only forming the opening 12 but also the proper positioning of the sealing ring 16 during casting of the manhole.

This unique structure which is characterized in the following as ring-mounting plug 30, is shown in detail in FIGS. 2, 3, 4, 7 and 8. This plug 30 is formed preferably of glass fiber reinforced plastic of the type usually employed in the fabrication of boats and the like, and in the preferred embodiment is in two sections 32 and 34, respectively. The plug 30 is generally circular in shape resembling the wheel and rim of an automobile, each section 32 and 34 being provided with annular discs 36 and 38, respectively, extending radially inwardly and in planar abutting engagement with each other. A plurality of removable fastening devices, such as nut and screw assemblies 40, are used for securing the two sections 32 and 34 together. Mating projections 41 and indentations 43 in the discs serve in locating the sections rotationally relative to each other. The outer peripheral portion of the assembled plug 30 is channel shaped as more clearly shown in FIG. 2 with the opposite sides 42 and 44 thereof flaring outwardly and generally being of frusto-conical shape. The perimeters of these sides 42 and 44, as viewed in FIG. 2, have a curvature as shown which conforms to the cylindrical shape of the finished manhole of FIG. 1. The purpose of this curvature will be explained in more detail later.

Considering for the moment only the plug section 34, it will be noted that it is provided with a frusto-conically shaped portion 46 which is integrally connected to the outer perimeter of the disc 34.

As regards the section 32, it is also provided with a frusto-conically shaped portion 48, larger in diameter yet of lesser axial depth than the conical portion 46.

Figure 7:
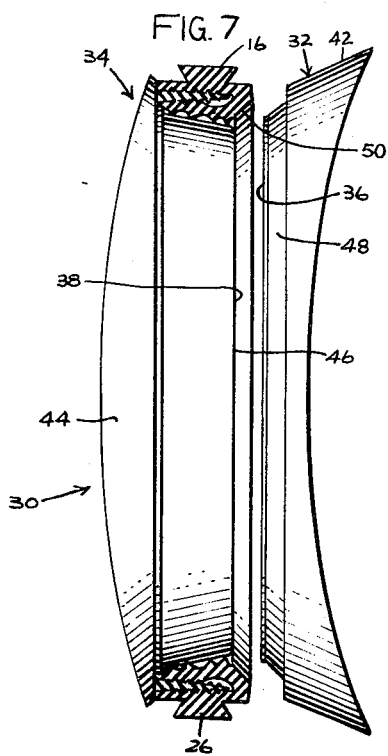
FIG. 7 is a side view in exploded form and partially sectioned of the plug of FIG. 2 but with the rubber-sealing ring of FIG. 5 mounted thereon, the plug being shown disassembled.

Utilization of the ring-mounting plug 30 will now be explained. With the two sections 32 and 34 disassembled as shown in FIG. 7, the sealing ring 16 is telescoped over the frusto-conical portion 46. As stated previously, the relative shapes and dimensions are shown to scale. The keystone annulus 26 is outermost.

The section 32 is next assembled to the section 34 and the two are fastened together by means of the nut and screw assemblies 40 or any similar quick-lock fastening devices conventionally available. The frusto-conical portion 48 on the section 32 is abutted against the similarly shaped portion 50 on the sealing ring 16 thereby mounting securely the sealing ring 16 on the plug 30. This assembly is now ready to be used in connection with the casting of the manhole which will be explained in connection with FIG. 9.

Figure 8:
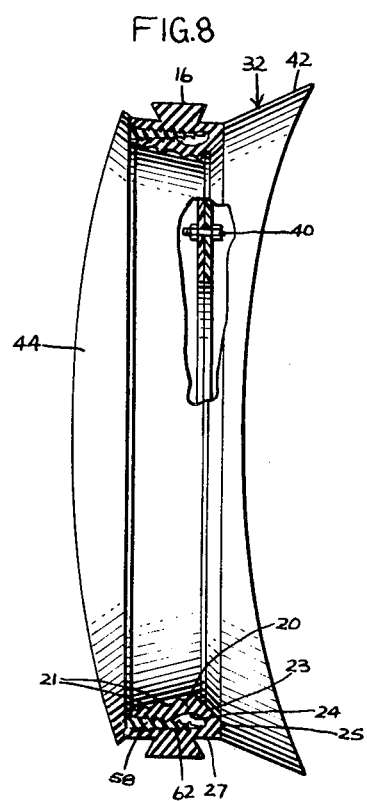
FIG. 8 is a view like FIG. 7 but with the sections of the plug secured together.

Cylindrical coaxial mold forms 52 and 54 of fiberglass, metal or the like, are spaced to provide for the shape and size of a manhole to be formed by filling the space 56 therebetween with concrete. However, prior to pouring concrete into the mold, the plug assembly of FIG. 8 is placed in the proper position in the cavity 56 (FIG. 9). As explained earlier, the perimeters of the flanges or sides 42 and 44 (FIG. 2) are formed generally to conform to the shape of the finished manhole, and as will now be apparent in FIG. 9, this shape conforms precisely to the opposite cylindrical surfaces of the cavity 56. Thus, the flanges 42 and 44 seal against the inner sides of the forms 52 and 54 to prevent the escape of concrete which may be poured into the cavity 56. The shapes of the perimeters of the flanges 42 and 44 in engagement with the forms 52 and 54 provide a circular opening in the manhole wall in the region to which the sealing ring 16 is anchored.

Liquid concrete is poured into the cavity 56 to form the manhole. This concrete fills the space around the plug 30 and the sealing ring 16. Upon hardening, the forms 52 and 54 are removed thereby leaving the structure shown in FIG. 10, the sealing ring 16 being firmly anchored into the concrete mass.

The plug 30 is disassembled by removing the fastening devices 40 permitting the two sections 32 and 34 to be withdrawn from the hardened concrete. These forms 32 and 34 may then be reused to form other rubber-lined hole structures.

A section of pipe 14 is installed in the manhole as follows. The entry end of the pipe section 14 is merely inserted into the opening defined by the ring 16. Properly sized, the ring 16 will lightly engage the surface of the pipe 14.

As shown more clearly in FIG. 11, a length of wedge material 58, shown in cross-section in FIG. 6, is inserted into the V-shaped space 60 in the ring 16 and there driven into place by means of a hammer or mallet. The wedge 58 serves to spread the lips or flanges 20 and 22 of the sealing ring 16 thereby forcing the flange 20 into intimate, sealing contact with the periphery of the pipe section 14.

In one working embodiment of this invention, if the sealing ring 16 and the wedge 58 are formed of rubber, it is preferred that the ring 16 be 40 durometer and the wedge 58 be 60 durometer. The wedge 58 is provided with longitudinally extending teeth 62 as shown, these engaging the annular serrations in the inner surfaces of the two flanges 20 and 22 (FIG. 5) to prevent withdrawal of the wedge 58. Once the wedge 58 has been driven into place, around the entire circumference of the sealing ring 16, the operation of forming the pipe joint is completed. In actual practice, the installation of such a joint requires no more than from three to four minutes by a single individual.

While a manhole has been described, any molded or cast object may be employed instead, such as rectangular septic tanks, electrical inspection boxes, pipe, and the like. Materials other than concrete may be employed, such as asbestos cement, vitrified clay, polyvinylchloride plastic, and the like.

An alternative technique utilizes the packing of concrete instead of the pouring as previously described. According to this, the inner mold form 54 (FIG. 9) is omitted, and the sections 32, 34 of plug 30 are made solid instead with the center holes shown. The plug 30 is installed as before against the form 52 (FIG. 9) following which concrete is packed from the interior of the mold assembly against the form 52 to the wall thickness desired, as shown in the drawings. Upon removal of the sections 32 and 34, the sealing ring 16 is left cast in place with the interior thereof free of concrete. Conventional concrete-packing equipment is used for this purpose.

The concrete employed for any of the molding or casting techniques disclosed may be of any desired dryness or wetness, i.e., different viscosities if pourable or dryness if packable. The concrete is settled in place according to the usual vibration equipment and techniques.

It will be noted upon viewing FIGS. 9 and 10 that the annular concrete sections between the keystone-shaped annulus 26 and the outer surface of the concrete wall 10 is of smaller dimension than the full thickness of the wall itself. In some instances, without the annular relief 24 in the gasket 16, if the wedge 58 is driven too tightly into the groove 60, the force involved can be transmitted through the rubber of the gasket to the aforesaid concrete sections breaking one or both sections away. With the annular relief 24 in the gasket, the rubber is permitted to deform thereinto relieving the damaging force that otherwise would be transmitted to the concrete sections. The relief 24 thus serves in achieving a sealing fit of the gasket 16 whichout damaging the concrete wall.

While there have been described above the principles of this invention in connection with specific apparatus, it is to be clearly understood that this description is made only by way of example and not as a limitation to the scope of the invention.

What is claimed is:

1. A pipe joint sealing device comprising an annular resilient body of rubber-like material, said body being generally of V-shaped cross-section which defines inner and outer annular body portions, a rigid concrete wall structure having an opening therein, said body being fitted into said opening in fluid-tight engagement therewith, said outer annular portion of said body having an interlocking engagement with said rigid structure provided by a socket-like portion in said structure which intimately engages said outer annular portion and holds the same against movement, the inside wall of one of said body portions having an annular relief therein which accommodates flexure of said rubber-like material theretoward relieving pressure against the pipe and concrete wall structure, and an elongated spreading element wedge-shaped in cross-section receiving between said annular body portions, said wall having at least one surface spaced from said socket-like portion thereby providing a corner portion of concrete between said surface and said socket-like portion.

2. The device of claim 1 in which said annular portion including a projection that extends radially outwardly, said projection being received by said socket-like portion in the perimeter of said opening, said projection being annular and of keystone shape in cross-section, said socket-like portion being of complementary shape thereby locking said body against axial and radial dislodgment, the outer surface of said outer annular portion is essentially cylindrical with said keystone-shaped projection extending radially outwardly therefrom, the perimeter of said opening conforming to and engaging said outer surface whereby said annular body extends radially inwardly of said opening, said inner annular portion having on the inner peripheral surface thereof coaxial annular ribs axially spaced apart, said ribs being of substantially the same radial depth so as to be engageable with the surface of a pipe section fitted into the opening defined by the ribs, said ribs in cross-section being substantially of triangular shape inclined to one side, the direction of inclination of said ribs being away from each other the apices of the ribs being radially innermost.

* * * * *